(12) United States Patent
Duarte et al.

(10) Patent No.: US 10,891,027 B2
(45) Date of Patent: *Jan. 12, 2021

(54) NAVIGATING AMONG ACTIVITIES IN A COMPUTING DEVICE

(71) Applicant: QUALCOMM Incorporated, San Diego, CA (US)

(72) Inventors: Matias Gonzalo Duarte, Sunnyvale, CA (US); Daniel Marc Gatan Shiplacoff, Los Altos, CA (US); Jeremy Godfrey Lyon, Sunnyvale, CA (US); Paul Mercer, Palo Alto, CA (US); Ralph Thomas, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,732

(22) Filed: May 4, 2020

(65) Prior Publication Data

US 2020/0264740 A1   Aug. 20, 2020

Related U.S. Application Data

(60) Continuation of application No. 16/112,194, filed on Aug. 24, 2018, now Pat. No. 10,678,403, which is a
(Continued)

(51) Int. Cl.
*G06F 3/0482* (2013.01)
*G06F 3/01* (2006.01)
(Continued)

(52) U.S. Cl.
CPC ............ *G06F 3/0482* (2013.01); *G06F 3/017* (2013.01); *G06F 3/0481* (2013.01);
(Continued)

(58) Field of Classification Search
CPC ...... G06F 3/017; G06F 3/0483; G06F 3/0488; G06F 3/04812; G06F 3/0484; G06F 3/0482; H04N 21/20; H04L 41/22
See application file for complete search history.

(56) References Cited

U.S. PATENT DOCUMENTS

| 4,680,577 | A | 7/1987 | Straayer et al. |
| 5,146,556 | A | 9/1992 | Hullot et al. |

(Continued)

FOREIGN PATENT DOCUMENTS

| AU | 2008100003 A4 | 2/2008 |
| CN | 1073784 A | 6/1993 |

(Continued)

OTHER PUBLICATIONS

Bederson B B., et al., "DateLens: A Fisheye Calendar Interface for PDAs," ACM Transactions on Computer-Human Interaction, vol. 11 (1), Mar. 2004, pp. 90-119.
(Continued)

*Primary Examiner* — Steven P Sax
(74) *Attorney, Agent, or Firm* — Paradice and Li LLC

(57) ABSTRACT

A computing device runs multiple activities concurrently and provides at least two modes for interacting with the activities. The user may toggle between the modes as desired. In a full-screen mode, one activity occupies substantially an entire display screen. In a windowed mode, the activity is visible within a window, and a portion of at least one other window is also visible. In the windowed mode, the user can cause windows to move, thereby changing focus from one activity to another. For example, the window having focus can be moved off the screen, to be replaced by a new window that is then given focus. The windows are ordered in a sequence and move in concert with one another; pushing one window off one edge of the screen causes a new
(Continued)

window to appear at the opposite edge. A persistent positional relationship can be established among windows.

28 Claims, 14 Drawing Sheets

Related U.S. Application Data continuation of application No. 13/932,439, filed on Jul. 1, 2013, now abandoned, which is a continuation of application No. 13/316,004, filed on Dec. 9, 2011, now Pat. No. 9,489,107, which is a division of application No. 12/126,145, filed on May 23, 2008, now Pat. No. 8,296,684.

(51) Int. Cl.
*H04L 12/24* (2006.01)
*G06F 9/451* (2018.01)
*G06F 3/0481* (2013.01)
*G06F 3/0483* (2013.01)
*G06F 3/0485* (2013.01)
*G06F 3/0488* (2013.01)

(52) U.S. Cl.
CPC .......... *G06F 3/0483* (2013.01); *G06F 3/0485* (2013.01); *G06F 3/0488* (2013.01); *G06F 9/451* (2018.02); *H04L 41/22* (2013.01)

(56) References Cited

U.S. PATENT DOCUMENTS

| | | | |
|---|---|---|---|
| 5,377,317 A | 12/1994 | Bates et al. | |
| 5,499,330 A | 3/1996 | Lucas et al. | |
| 5,574,846 A | 11/1996 | Yoshimura et al. | |
| 5,586,244 A | 12/1996 | Berry et al. | |
| 5,588,105 A | 12/1996 | Foster et al. | |
| 5,675,361 A | 10/1997 | Santilli | |
| 5,677,708 A | 10/1997 | Matthews, III et al. | |
| 5,766,708 A | 6/1998 | Panizza | |
| 6,011,537 A | 1/2000 | Slotznick | |
| 6,061,050 A | 5/2000 | Allport et al. | |
| 6,323,846 B1 | 11/2001 | Westerman et al. | |
| 6,407,757 B1 | 6/2002 | Ho | |
| 6,441,811 B1 | 8/2002 | Sawada et al. | |
| 6,570,557 B1 | 5/2003 | Westerman et al. | |
| 6,577,330 B1 | 6/2003 | Tsuda et al. | |
| 6,590,593 B1 | 7/2003 | Robertson et al. | |
| 6,600,936 B1 | 7/2003 | Kaerkkaeinen et al. | |
| 6,613,100 B2 | 9/2003 | Miller | |
| 6,677,932 B1 | 1/2004 | Westerman | |
| 6,680,677 B1 | 1/2004 | Tiphane | |
| 6,686,906 B2 | 2/2004 | Salminen et al. | |
| 6,765,559 B2 | 7/2004 | Hayakawa | |
| 6,915,489 B2 | 7/2005 | Gargi | |
| 6,924,789 B2 | 8/2005 | Bick | |
| 6,958,749 B1 | 10/2005 | Matsushita et al. | |
| 6,992,658 B2 | 1/2006 | Wu et al. | |
| 7,030,861 B1 | 4/2006 | Westerman et al. | |
| 7,051,291 B2 | 5/2006 | Sciammarella et al. | |
| 7,151,528 B2 | 12/2006 | Taylor et al. | |
| 7,159,176 B2 | 1/2007 | Billmaier et al. | |
| 7,170,500 B2 | 1/2007 | Canova et al. | |
| 7,346,855 B2 | 3/2008 | Hellyar et al. | |
| 7,352,363 B2 | 4/2008 | Coates et al. | |
| 7,360,166 B1 | 4/2008 | Krzanowski | |
| 7,394,452 B2 | 7/2008 | Wong et al. | |
| 7,434,177 B1 | 10/2008 | Ording et al. | |
| 7,454,382 B1 | 11/2008 | Triplett | |
| 7,479,949 B2 | 1/2009 | Jobs et al. | |
| 7,610,599 B1 | 10/2009 | Nashida et al. | |
| 7,650,569 B1 | 1/2010 | Allen et al. | |
| 7,653,883 B2 * | 1/2010 | Hotelling ............ G06F 3/04883 715/863 | |
| 7,663,607 B2 | 2/2010 | Hotelling et al. | |
| 7,705,830 B2 | 4/2010 | Westerman et al. | |
| D615,989 S | 5/2010 | Chaudhri | |
| 7,770,136 B2 | 8/2010 | Beeck et al. | |
| 7,800,592 B2 | 9/2010 | Kerr et al. | |
| 7,934,168 B2 | 4/2011 | Sakamoto et al. | |
| 8,001,479 B2 | 8/2011 | Katsuranis et al. | |
| 8,001,488 B1 | 8/2011 | Lam | |
| 8,019,388 B2 | 9/2011 | Chiam et al. | |
| 8,019,389 B2 | 9/2011 | Kim et al. | |
| 8,159,469 B2 | 4/2012 | Shiplacoff et al. | |
| 8,214,768 B2 | 7/2012 | Boule et al. | |
| 8,266,550 B1 | 9/2012 | Cleron et al. | |
| 8,296,676 B2 | 10/2012 | Millington | |
| 8,296,684 B2 | 10/2012 | Duarte et al. | |
| 8,373,673 B2 | 2/2013 | Shiplacoff et al. | |
| 8,423,076 B2 | 4/2013 | Kim et al. | |
| 8,448,083 B1 | 5/2013 | Migos et al. | |
| 8,464,176 B2 | 6/2013 | Van Dok et al. | |
| 8,490,019 B2 | 7/2013 | Jarrett et al. | |
| 8,564,543 B2 | 10/2013 | Chaudhri et al. | |
| 8,633,900 B2 | 1/2014 | Jin et al. | |
| 8,683,362 B2 | 3/2014 | Shiplacoff et al. | |
| 8,893,039 B2 | 11/2014 | Kawashima et al. | |
| 8,933,892 B2 | 1/2015 | Woolley et al. | |
| 9,104,292 B2 | 8/2015 | Chen | |
| 9,116,721 B2 | 8/2015 | Matsushima et al. | |
| 9,154,606 B2 | 10/2015 | Tseng et al. | |
| 9,330,521 B2 | 5/2016 | Lutnick et al. | |
| 9,395,888 B2 | 7/2016 | Shiplacoff et al. | |
| 9,489,107 B2 | 11/2016 | Duarte et al. | |
| 9,513,765 B2 | 12/2016 | Miyazaki et al. | |
| 9,772,751 B2 | 9/2017 | Anzures et al. | |
| 2001/0012023 A1 | 8/2001 | Kobayashi et al. | |
| 2002/0032554 A1 | 3/2002 | Nakagawa | |
| 2002/0089536 A1 | 7/2002 | Dang | |
| 2002/0109735 A1 | 8/2002 | Chang et al. | |
| 2002/0191013 A1 | 12/2002 | Abrams | |
| 2003/0071849 A1 | 4/2003 | Ferri | |
| 2003/0085870 A1 | 5/2003 | Hinckley et al. | |
| 2003/0146897 A1 | 8/2003 | Hunter | |
| 2003/0148799 A1 | 8/2003 | Chen | |
| 2003/0222917 A1 | 12/2003 | Trantow | |
| 2004/0025112 A1 | 2/2004 | Chasen et al. | |
| 2004/0049743 A1 | 3/2004 | Bogward | |
| 2004/0070631 A1 | 4/2004 | Brown et al. | |
| 2004/0100479 A1 | 5/2004 | Nakano et al. | |
| 2004/0189720 A1 | 9/2004 | Wilson et al. | |
| 2004/0193413 A1 | 9/2004 | Wilson et al. | |
| 2005/0003851 A1 | 1/2005 | Chrysochoos et al. | |
| 2005/0021336 A1 | 1/2005 | Katsuranis | |
| 2005/0024322 A1 | 2/2005 | Kupka | |
| 2005/0057524 A1 | 3/2005 | Hill et al. | |
| 2005/0071761 A1 | 3/2005 | Kontio | |
| 2005/0078093 A1 | 4/2005 | Peterson et al. | |
| 2005/0088416 A1 | 4/2005 | Hollingsworth | |
| 2005/0102638 A1 | 5/2005 | Jiang et al. | |
| 2005/0131945 A1 | 6/2005 | Muller et al. | |
| 2005/0149879 A1 | 7/2005 | Jobs et al. | |
| 2005/0188329 A1 * | 8/2005 | Cutler ................... G06F 3/0481 715/804 | |
| 2005/0190280 A1 | 9/2005 | Haas et al. | |
| 2005/0192924 A1 | 9/2005 | Drucker et al. | |
| 2005/0219227 A1 | 10/2005 | Yamahata et al. | |
| 2005/0240618 A1 | 10/2005 | Nickerson et al. | |
| 2005/0243053 A1 | 11/2005 | Liess et al. | |
| 2006/0007181 A1 | 1/2006 | Jung et al. | |
| 2006/0010395 A1 | 1/2006 | Aaltonen | |
| 2006/0015878 A1 | 1/2006 | Ritter | |
| 2006/0026521 A1 | 2/2006 | Hotelling et al. | |
| 2006/0026535 A1 | 2/2006 | Hotelling et al. | |
| 2006/0053387 A1 | 3/2006 | Ording | |
| 2006/0075348 A1 | 4/2006 | Xu et al. | |
| 2006/0085757 A1 | 4/2006 | Andre et al. | |
| 2006/0123359 A1 | 6/2006 | Schatzberger | |
| 2006/0125962 A1 | 6/2006 | Shelton et al. | |
| 2006/0161847 A1 | 7/2006 | Holecek et al. | |
| 2006/0161861 A1 | 7/2006 | Holecek et al. | |
| 2006/0181548 A1 | 8/2006 | Hafey et al. | |

(56) References Cited

U.S. PATENT DOCUMENTS

| | | |
|---|---|---|
| 2006/0197753 A1 | 9/2006 | Hotelling |
| 2006/0209016 A1 | 9/2006 | Fox et al. |
| 2006/0218504 A1 | 9/2006 | Hiroi et al. |
| 2006/0224989 A1 | 10/2006 | Pettiross et al. |
| 2006/0238517 A1 | 10/2006 | King et al. |
| 2006/0267951 A1 | 11/2006 | Rainisto |
| 2006/0268100 A1 | 11/2006 | Karukka et al. |
| 2007/0101292 A1 | 5/2007 | Kupka |
| 2007/0101297 A1 | 5/2007 | Forstall et al. |
| 2007/0124694 A1 | 5/2007 | Van De Sluis et al. |
| 2007/0146347 A1 | 6/2007 | Rosenberg |
| 2007/0152978 A1 | 7/2007 | Kocienda et al. |
| 2007/0152984 A1 | 7/2007 | Ording et al. |
| 2007/0165004 A1 | 7/2007 | Seelhammer et al. |
| 2007/0174791 A1 | 7/2007 | Park et al. |
| 2007/0177803 A1 | 8/2007 | Elias et al. |
| 2007/0220440 A1 | 9/2007 | Song et al. |
| 2007/0226647 A1 | 9/2007 | Louch |
| 2007/0236477 A1 | 10/2007 | Ryu et al. |
| 2007/0245263 A1 | 10/2007 | Hale et al. |
| 2007/0247431 A1 | 10/2007 | Skillman et al. |
| 2007/0247440 A1 | 10/2007 | Shin et al. |
| 2007/0250787 A1 | 10/2007 | Kawahara et al. |
| 2007/0273668 A1 | 11/2007 | Park et al. |
| 2007/0277124 A1 | 11/2007 | Shin et al. |
| 2007/0288860 A1 | 12/2007 | Ording et al. |
| 2007/0296709 A1 | 12/2007 | Guanghai |
| 2008/0001924 A1 | 1/2008 | De Los Reyes et al. |
| 2008/0034317 A1 | 2/2008 | Fard et al. |
| 2008/0036743 A1 | 2/2008 | Westerman et al. |
| 2008/0052637 A1 | 2/2008 | Ben-Yoseph et al. |
| 2008/0055265 A1 | 3/2008 | Bewley et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0064499 A1 | 3/2008 | Grant et al. |
| 2008/0082930 A1 | 4/2008 | Omernick et al. |
| 2008/0084400 A1 | 4/2008 | Rosenberg |
| 2008/0084440 A1 | 4/2008 | Omata et al. |
| 2008/0089587 A1 | 4/2008 | Kim et al. |
| 2008/0094371 A1 | 4/2008 | Forstall et al. |
| 2008/0100593 A1 | 5/2008 | Skillman et al. |
| 2008/0104544 A1 | 5/2008 | Collins et al. |
| 2008/0115081 A1 | 5/2008 | Sankaravadivelu et al. |
| 2008/0122796 A1 | 5/2008 | Jobs et al. |
| 2008/0148149 A1* | 6/2008 | Singh .................... G06F 3/0482 715/700 |
| 2008/0168403 A1 | 7/2008 | Westerman et al. |
| 2008/0168405 A1 | 7/2008 | Tolmasky et al. |
| 2008/0177994 A1* | 7/2008 | Mayer .................. G06F 9/4418 713/2 |
| 2008/0195969 A1 | 8/2008 | Brown et al. |
| 2008/0204402 A1 | 8/2008 | Hirata et al. |
| 2008/0256472 A1 | 10/2008 | Kim et al. |
| 2008/0281689 A1 | 11/2008 | Blinnikka et al. |
| 2008/0297484 A1 | 12/2008 | Park et al. |
| 2008/0303794 A1 | 12/2008 | Bolt et al. |
| 2008/0307335 A1 | 12/2008 | Chaudhri et al. |
| 2008/0316183 A1 | 12/2008 | Westerman et al. |
| 2009/0013282 A1 | 1/2009 | Mercer |
| 2009/0019031 A1 | 1/2009 | Krovitz et al. |
| 2009/0070691 A1 | 3/2009 | Jain |
| 2009/0085886 A1 | 4/2009 | Huang et al. |
| 2009/0093277 A1 | 4/2009 | Lee et al. |
| 2009/0106694 A1 | 4/2009 | Kraft et al. |
| 2009/0153438 A1 | 6/2009 | Miller et al. |
| 2009/0164928 A1 | 6/2009 | Brown et al. |
| 2009/0183120 A1 | 7/2009 | Ording et al. |
| 2009/0199241 A1 | 8/2009 | Unger et al. |
| 2009/0217198 A1 | 8/2009 | Jung |
| 2009/0249203 A1 | 10/2009 | Tsuruta et al. |
| 2009/0267909 A1 | 10/2009 | Chen et al. |
| 2009/0271731 A1 | 10/2009 | Lin et al. |
| 2009/0276702 A1 | 11/2009 | Bamford et al. |
| 2009/0278806 A1 | 11/2009 | Duarte et al. |
| 2010/0031202 A1 | 2/2010 | Morris et al. |
| 2010/0081475 A1 | 4/2010 | Chiang et al. |
| 2010/0122290 A1 | 5/2010 | Allen et al. |
| 2010/0156656 A1 | 6/2010 | Duarte et al. |
| 2010/0156813 A1 | 6/2010 | Duarte et al. |
| 2010/0169766 A1 | 7/2010 | Duarte et al. |
| 2010/0211872 A1 | 8/2010 | Rolston et al. |
| 2010/0214278 A1 | 8/2010 | Miura |
| 2010/0235733 A1 | 9/2010 | Drislane et al. |
| 2010/0295801 A1 | 11/2010 | Bestle et al. |
| 2011/0093494 A1 | 4/2011 | Chandler et al. |
| 2012/0278756 A1 | 11/2012 | Shah et al. |
| 2013/0298057 A1 | 11/2013 | Duarte et al. |
| 2014/0258897 A1 | 9/2014 | Shiplacoff et al. |
| 2015/0169528 A1 | 6/2015 | Sjogreen et al. |
| 2016/0202859 A1 | 7/2016 | Anzures et al. |
| 2018/0018072 A1 | 1/2018 | Shiplacoff et al. |
| 2018/0364876 A1 | 12/2018 | Duarte et al. |
| 2019/0012054 A1 | 1/2019 | Shiplacoff et al. |

FOREIGN PATENT DOCUMENTS

| | | |
|---|---|---|
| CN | 1274439 A | 11/2000 |
| CN | 1107259 C | 4/2003 |
| CN | 1458565 A | 11/2003 |
| CN | 1739083 A | 2/2006 |
| CN | 1860429 A | 11/2006 |
| CN | 1896921 A | 1/2007 |
| CN | 1901637 A | 1/2007 |
| CN | 1910577 A | 2/2007 |
| CN | 1920762 A | 2/2007 |
| CN | 101005547 A | 7/2007 |
| CN | 101038524 A | 9/2007 |
| CN | 101052939 A | 10/2007 |
| CN | 101057209 A | 10/2007 |
| CN | 101133385 A | 2/2008 |
| CN | 101167045 A | 4/2008 |
| CN | 101390039 A | 3/2009 |
| CN | 101566917 A | 10/2009 |
| CN | 101627360 A | 1/2010 |
| CN | 106095323 A | 11/2016 |
| EP | 0548646 A1 | 6/1993 |
| EP | 1462921 A2 | 9/2004 |
| EP | 1688830 A1 | 8/2006 |
| EP | 1705583 A1 | 9/2006 |
| EP | 1942402 A1 | 7/2008 |
| EP | 1962480 A2 | 8/2008 |
| EP | 2068236 A1 | 6/2009 |
| EP | 2076000 A2 | 7/2009 |
| GB | 2480777 A | 11/2011 |
| JP | 2002259001 A | 9/2002 |
| KR | 100801089 B1 | 2/2008 |
| WO | WO-03007143 A1 | 1/2003 |
| WO | WO-2006017138 A2 | 2/2006 |
| WO | WO-2008030976 A2 | 3/2008 |
| WO | WO-2009080653 A1 | 7/2009 |
| WO | WO-2010096219 A2 | 8/2010 |

OTHER PUBLICATIONS

Bederson B.B., "Fisheye Menus", Proceedings of the 2000 ACM SIGCPR Conference, Chicago, IL, Apr. 6-8, 2000; [ACM Symposium on User Interface Software and Technology], New York, NY, ACM, US, Nov. 5, 2000 (Nov. 5, 2000), pp. 217-225, XP001171611, DOI: 10.1145/354401.354782, ISBN: 978-1-58113-212-0, p. 217, col. 1, paragraph 1—p. 222, col. 1, paragraph 2, figures 1-4.
Card S K., et al., "The Design Space of Input Devices," CHI 90 Proceedings, Apr. 1990, pp. 117-124.
Card S K., et al., "The Information Visualizer, an Information Workspace," CHI 91 Proceedings, 1991, pp. 181-188.
Celeste T., "The Mac as a Touchscreen Business Computer," Tom's Guide, URL: https://www.tomsguide.com/us/macworld-touchscreen-mac,news-417.html, Jan. 22, 2008, 6 pages.
CNN: "5 Decades of CES hits and epic flops," CNN Money, Jan. 4, 2011, 1 Page, Retrieved from the URL: https://money.cnn.com/galleries/2011/technology/1101/gallery.CES_history/7.html.

(56) References Cited

OTHER PUBLICATIONS

"Designing for the Multitasker," Internet Article, Publication Date: Mar. 17, 2010;< http://blog.graphicpeel.com/post/454779602/designing-for-the-multitasker>.

European Search Report—EP19156309—Search Authority—Munich—dated Apr. 16, 2019.

Extended European Search Report, European Application No. 09751303.0, dated Apr. 2, 2012, pp. 1-6.

Furnas G W., "Generalized Fisheye Views," CHI' 86 Proceedings, Apr. 1986, pp. 16-23.

International Search Report dated Oct. 30, 2009, issued in international application No. PCT/US2009/044389.

IPhone User's Guide, Chapter 5, pp. 58-59, Apple Safari Browser, "Opening Multiple Webpages at Once," (2007).

"A Unique Landscape: Comprehensive Introduction of iPhone", Digital Communication, No. 21, 2007, publication date: Nov. 15, 2007.

Megna M., "Palm Pre Sales Fail to Meet Analyst Expectations," InternetNews, Aug. 14, 2009, 1 Page, Retrieved from the URL: http://www.internetnews.com/mobility/article.php/3834521.

Moyle M., et al., The Design and Evaluation of Flick Gesture for 'Back' and 'Forward' in Web Browsers, Proceedings of the Fourth Australian user interface conference on User interfaces 2003, vol. 18, Australian Computer Society, Inc. Darlinghurst, Australia, copyright 2003, ISBN:0-909925-96-8. 8 pages.

Myers B. A., "User-Interface Tools: Introduction and Survey," IEEE Software, Jan. 1989, pp. 15-23.

Patent Assignment history log from USPTO for U.S. Pat. No. 9,116,593.

Patent Assignment history log from USPTO for U.S. Appl. No. 13/932,439.

Report on the Filing or Determination of an Action Regarding a Patent or Trademark—Case 3:17-cv-02403, filed Nov. 30, 2017, 1 page.

Robertson G. G., et al., "Cone Trees: Animated 3D Visualizations of Hierarchical Information," CHI 91' Proceedings, 1991, pp. 189-194.

Rubine D. H., "The Automatic Recognition of Gestures," Dec. 1, 1991, XP055109432, Retrieved from the Internet: URL: http://citeseer.ist.psu.edu/viewdocjdownload?doi=10.1.1.116.1350&rep=rep1&type=pdf [retrieved on Mar. 24, 2014] , 285 pages.

Rubine D., "Specifying Gestures by Example", ACM SIGGRAPH Computer Graphics, Jul. 1991, vol. 25 (4), pp. 329-337.

Spear Z., "Apple awarded key "multi-touch" patent covering the iPhone," AppleInsider, Jan. 26, 2009, 14 pages. Retrieved from the URL: https://appleinsider.com/articles/09/01/26/apple_awarded_key_multi_touch_patent_covering_the_iphone.

State Intellectual Property Office of the People's Republic of China Notice of Acceptance of Request for Invalidation for Application No. 201310491586.1 dated Dec. 12, 2017, 1 Page.

State Intellectual Property Office of the People's Republic of China Notification of Examination Decision for Invalidation Request, Application/Patent No. 200980118088.4; Case No. 4W106638, Nov. 7, 2018, 30 Pages.

State Intellectual Property Office of the People's Republic of China Notification of Examination Decision for Invalidation Request, Application/Patent No. 201310491586.1; Case No. 4W106649, Jul. 25, 2018, 38 Pages.

U.S. Appl. No. 60/937,993, Inventor Jobs S.P., filed Jun. 29, 2007.

U.S. Appl. No. 61/019,841, Inventor Anzures F.A., filed Jan. 8, 2008.

U.S. Appl. No. 61/048,219, Inventor Lin Y-C., filed Apr. 27, 2008.

"Welcome to Leopard," User Manual, Apple Inc, 2007, 81 pages.

"Welcome to Panther," User Manual, Apple Computer Inc, 2004, 24 pages.

"Welcome to Tiger," User Manual, Apple Computer Inc, 2005, 32 pages.

Westerman W., et al., "Multi-Touch: A New Tactile 2-D Gesture Interface for Human Computer Interaction," Proceedings of the Human Factors and Ergonomics Society 45th Annual Meeting, 2001, pp. 632-636.

Williams A., "Why WebOS Failed, According to ex-Palm Exec," Trusted Reviews, Jan. 3, 2012, pp. 1-3, Retrieved from the URL: https://www.trustedreviews.com/news/why-webos-failedaccording-to-ex-palm-exec-2907024.

Written Opinion—PCT/US2009/044389—ISA/EPO—dated Oct. 30, 2009.

Yamaashi K., et al., "Fisheye Videos: Distorting Multiple Videos in Space and Time Domain According to Users' Interests," CHI 93' Proceedings, 1993, pp. 119-120.

\* cited by examiner

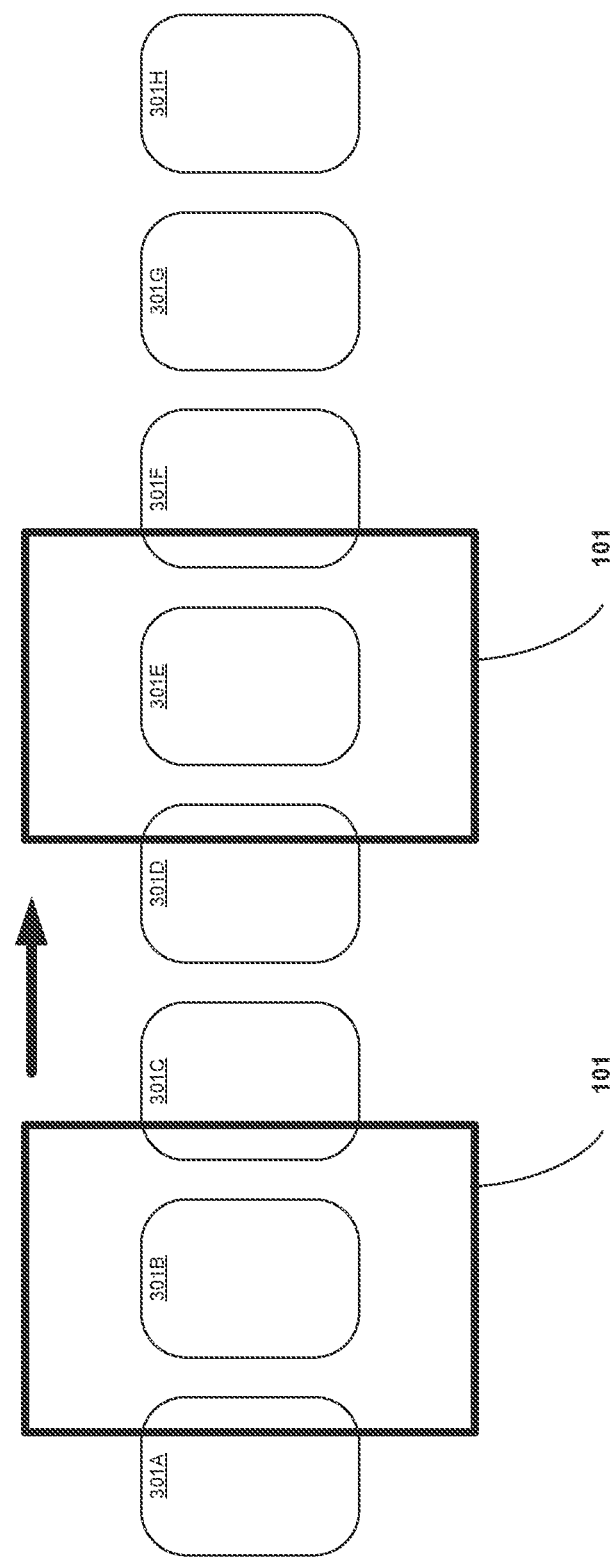

NAVIGATING AMONG ACTIVITIES IN A COMPUTING DEVICE

CROSS-REFERENCE TO RELATED APPLICATIONS

The present application is a continuation of U.S. patent application Ser. No. 16/112,194 filed Aug. 24, 2018 for "Navigating Among Activities in a Computing Device," which claims priority as a continuation of U.S. patent application Ser. No. 13/932,439 filed Jul. 1, 2013 for "Navigating Among Activities in a Computing Device," which claims priority as a continuation of U.S. patent application Ser. No. 13/316,004 filed Dec. 9, 2011 for "Navigating Among Activities in a Computing Device," now U.S. Pat. No. 9,489,107, which claims priority as a divisional of U.S. patent application Ser. No. 12/126,145 filed May 23, 2008 for "Navigating Among Activities in a Computing Device," now U.S. Pat. No. 8,296,684, the disclosures of all of which are incorporated by reference herein.

FIELD OF THE INVENTION

The present invention relates to application management in computing devices, and more particularly to systems and methods for navigating among activities such as applications in such devices.

DESCRIPTION OF THE RELATED ART

Many currently available computing devices run operating systems that offer users the opportunity to run several applications at the same time, and even to perform several activities simultaneously, within a single application and/or among two or more applications. For example, a user may open an e-mail application, a word processing application, an on-screen calculator, and a web browser, so that all of the applications are open concurrently. The user may open several documents within the word processing application, and may open several e-mail messages. Such an arrangement allows the user to easily move from one task to another by keeping these various applications and activities open at the same time.

Conventionally, such an operating paradigm is accomplished by the use of multiple overlapping windows within a graphical user interface. A desktop metaphor is often employed, wherein the user can move and resize windows on a display screen by direct manipulation. Thus, each application may have a window or several windows; at any given time, one window has focus (usually indicated as such by being situated on top of the other windows). Other windows may be visible, invisible, or partially visible (for example if they are partially or completely obscured by other windows). A user can switch from one task to another by causing a different window to have focus; this is commonly accomplished by clicking on a visible portion of the window being activated, or by clicking on a button or icon representing the window or application in a task bar, dock, or similar construct. In some operating systems, pop-up menus and/or keyboard shortcuts may be available for switching among applications or documents.

Overlapping windows are a highly effective mechanism for application management. They exploit the user's spatial memory by associating a particular area of the screen with a particular task being performed. A user may find it easier to return to a previously opened window when he or she remembers that the window was placed at a particular location on the screen, as compared with a list or menu of open windows that does not provide a model of spatial placement and stability.

One issue with conventional window-based mechanisms for application management is that a large screen size is usually needed. Users faced with limited screen space must choose between, on the one hand, making windows smaller and thus reducing available workspace within each application, and, on the other hand, stacking windows atop each other so that only one window (or very few) is visible at a time. Reducing workspace can make it very difficult to use an application, particularly for applications such as word processing, photo editing, drawing, and the like. Stacking windows reduces the ease with which the user can switch from one application or document to another, as it is more difficult to see what is currently open and to find the appropriate window to be activated. When windows are stacked, users usually resort to navigation via taskbar, dock, menu, keyboard shortcut, or the like, thereby reducing the advantages of the overlapping window paradigm.

Some systems, such as the Mac OS operating system offered by Apple, Inc. of Cupertino, Calif., offer a mechanism for navigating among open applications by temporarily moving and shrinking open windows, moving the windows apart from one another so that they do not overlap. The user can then activate one of the windows; the original window positions and sizes are then restored, with the activated window on top. This feature is effective in allowing users to quickly switch among open applications and documents, but still requires a relatively large amount of screen space so as to effectively show the temporarily shrunk windows when the user is to select among them.

Mobile devices such as smartphones, personal digital assistants, music players, handheld computers, and the like are becoming increasingly powerful. Many are now able to run several applications concurrently, and to perform sophisticated functions that rival traditional computing devices. However, most such devices have extremely small screens, when compared to laptop or desktop computers. Thus, the conventional window-based techniques for navigating among open applications and documents do not function very well on mobile devices. There is insufficient screen space to display multiple overlapping windows. In fact, many such devices do not even have enough space to display a task bar or dock. Rather, the entire screen is often devoted to a single application, document, message, task, or activity, so as to make the most effective use of the extremely limited amount of space available.

What is needed is a system and method for application management that provides the advantages of multiple overlapping windows but is effective for a device having a small screen. What is further needed is a system and method that allows users to switch easily among activities, including applications, documents, and tasks, in a device having limited screen space. What is further needed is a system and method that is scalable to different screen sizes, and that provides solutions for all application and activity management, including starting activities, ending activities, and switching from one activity to another.

SUMMARY

According to the present invention, a computing device runs two or more activities concurrently and provides at least two modes for interacting with the activities. The user may toggle between the modes as desired. A button or other control is provided for switching between full-screen mode and windowed mode.

In a full-screen mode, one activity occupies substantially an entire display screen.

In a windowed mode, the activity is visible within a window, and a portion of at least one other window is also visible. Thus, the window that has focus is visible in full, while at least one other window is only partially visible. The window occupied by the activity is referred to as having focus. In the windowed mode, the user can cause windows to move on the screen, so as to change focus from one activity to another. For example, the window having focus can be moved off the screen, to be replaced by a new window that is then given focus. In one aspect, the activities are ordered in a sequence and the windows appear in a corresponding sequence. In one aspect, the windows move in concert with one another; pushing one window off one edge of the screen causes a new window to appear at the opposite edge. A persistent positional relationship can be established among windows.

In response to a user command, the windows shift position on the screen, so that the window that currently has focus becomes only partially visible and one of the other windows becomes fully visible and has focus. The windows move in concert with each other, in response to user commands Thus, for example, if the user indicates that the central window should move in a rightward direction, then the entire display shifts to the right, as follows:

- The central window (which has focus) moves to the right, so that it is only partially visible along the right hand side of the display.
- If any window was partially visible to the right of the window that has focus, it moves off the right edge of the screen so that it is no longer visible.
- If any window was partially visible to the left of the window that has focus, it moves to the right so that it is now fully visible and has focus.

The user indicates such movement, for example, by direct manipulation of the displayed windows. This can be performed on a touch screen, for example, by dragging the central window to the left or to the right on the screen or by tapping on a window that is partially displayed. Alternatively, a trackball, touch-sensitive pad, or other input device can be provided for facilitating such direct manipulation.

In one embodiment, the window that currently has focus is always fully visible and displayed in a substantially central location on the screen with respect to partially displayed windows.

Window motion can be constrained to a single axis, for example horizontal or vertical but not both, so as to simplify the positional relationship among windows. Alternatively, two or more axes of movements can be made available.

Once the user has moved the desired window to the central position so that it has focus, he or she can indicate that the display should return to full-screen mode, so that the activity having focus occupies substantially the entire screen. Alternatively, the device can return to full-screen mode automatically after a period of time elapses where no window movement takes place, or if the user starts to interact with the activity that has focus.

Thus, the full-screen display mode may be used for interacting with the activity, and the windowed mode may be used for switching from one activity to another. However, in one aspect the invention allows full interaction with the activity in windowed mode as well.

A persistent positional relationship can be established among windows. The positional relationship can be a one-dimensional sequence or some more complex two-dimensional relationship. The positional relationship is persistent in the sense that it does not change unless the user indicates that it should be changed, or some other event takes place that indicates a change is warranted (such as non-use of an application, or an application crashing or being dismissed).

Additional features and advantages will become apparent in the description provided below.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

FIG. 7 is a conceptual depiction of a sequence switching from one activity to another according to one embodiment of the present invention.

DETAILED DESCRIPTION

In the following description, reference is made herein to "activities". In the context of the present invention, an "activity" is intended to include a software application, a task, a document, a page, and/or any other activity that can be performed in connection with an electronic device. As described herein, the present invention provides techniques for starting and ending activities, and for switching among activities.

System Architecture

The present invention can be implemented on any electronic device, such as a handheld computer, personal digital assistant (PDA), personal computer, kiosk, cellular telephone, and the like. For example, the invention can be implemented as a feature of an application management paradigm for a software application or operating system running on such a device. Accordingly, the present invention can be implemented as part of a graphical user interface for controlling software on such a device.

The invention is particularly well-suited to devices such as smartphones, handheld computers, and PDAs, which have limited screen space and which are capable of running several software applications concurrently. One skilled in the art will recognize, however, that the invention can be practiced in many other contexts, including any environment in which it is useful to switch easily and smoothly from one activity to another. Accordingly, the following description is intended to illustrate the invention by way of example, rather than to limit the scope of the claimed invention.

Figure 1:
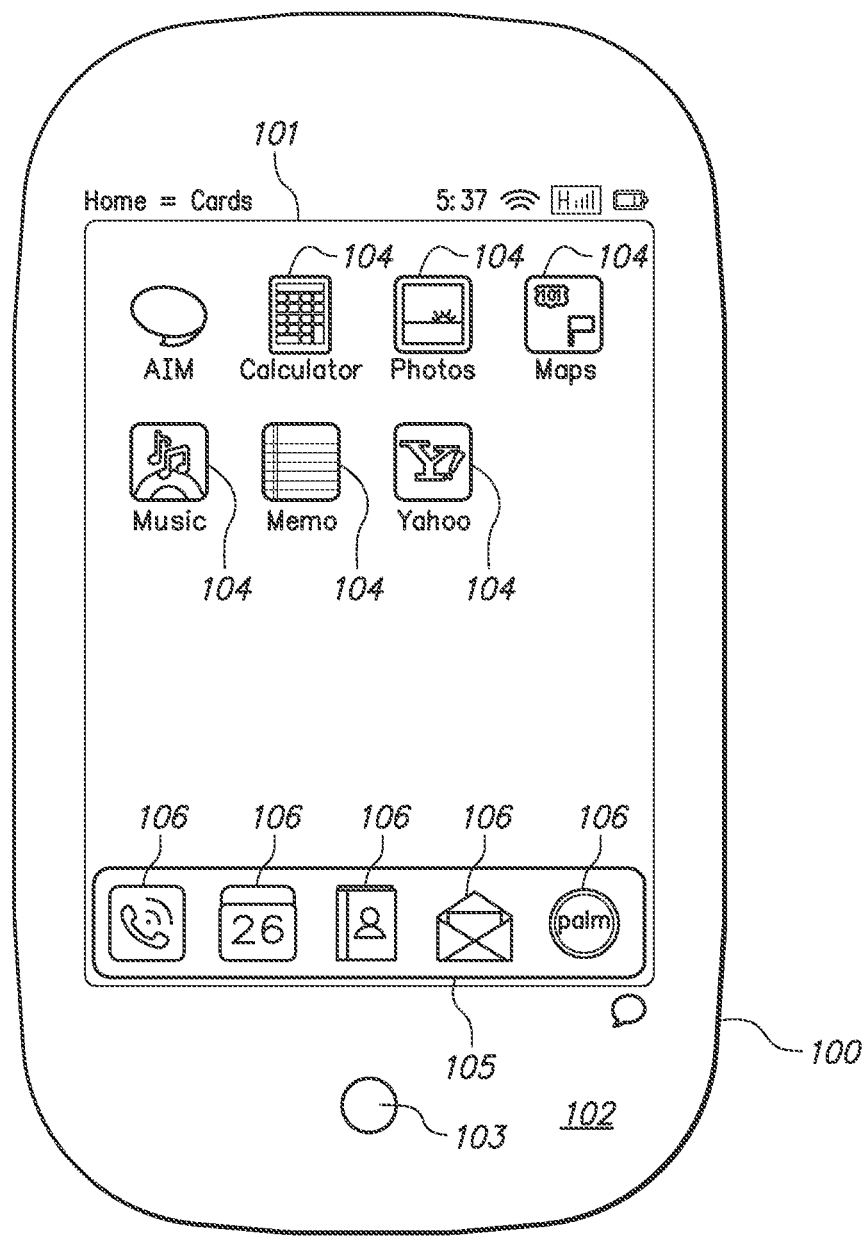
FIG. 1 depicts a display screen showing a launcher for initiating an activity such as an application.

Referring now to FIG. 1, there is shown an example of an example of a device 100 including a display screen 101 showing a launcher including several icons 104 representing applications that can be opened by the user. A dock 105 is also shown, including additional icons 106 for launching commonly used applications and other functions. Dock 105 is not necessary for the present invention, but is shown for illustrative purposes only.

In one embodiment, screen 101 is touch-sensitive, so that a user can activate an application or function by touching a displayed icon 104, 106. In one embodiment, device 100 also includes a touch-sensitive gesture area 102 for entering gesture-based commands, as described in the above-referenced related application. In another embodiment, screen 101 and/or gesture area 102 is sensitive to user motion in proximity to the surface, so as to detect gestures and commands performed near the surface but without necessarily contacting the surface.

For illustrative purposes, device 100 as shown in FIG. 1 is a personal digital assistant or smartphone. Such devices commonly have telephone, email, and text messaging capability, and may perform other functions including, for example, playing music and/or video, surfing the web, running productivity applications, and the like. The present invention can be implemented in any type of device having a touch-sensitive screen, and is not limited to devices having the listed functionality. In addition, the particular layout shown in FIG. 1 is merely exemplary and is not intended to be restrictive of the scope of the claimed invention.

Touch-sensitive screen 101 and gesture area 102 can be implemented using any technology that is capable of detecting a location of contact and/or user motion proximate to the surface. Alternatively, the present invention can be implemented with other user input mechanisms, such as a keyboard, trackball, stylus, or the like. One skilled in the art will recognize that the techniques of the present invention are well suited to direct manipulation, but that any input technique can be used. In one embodiment, gesture area 102 provides a touch-sensitive control area extending beyond the edges of touch-sensitive screen 101, as described in related application Ser. No. 12/115,992, filed May 6, 2008, for "Extended Touch-Sensitive Control Area for Electronic Device," the disclosure of which is incorporated herein.

Device 101 as shown in FIG. 1 also has a physical button 103. In one embodiment, physical button 103 can be used to toggle between full-screen mode and windowed mode, as described in more detail below. Physical button 103 is not needed for the present invention, and is shown for illustrative purposes only.

As described herein, at least two modes are available for interacting with device 101: a full-screen mode in which an application or other activity occupies substantially the entire display screen 101, and a windowed mode in which at least two windows are presented, at least one of which is only partially visible, with an application or other activity occupying each window. The full-screen mode is designed to devote a greater amount of screen space to the active activity, while the windowed mode provides a mechanism for navigating among activities and for rearranging, initiating, and terminating activities.

Figure 2:
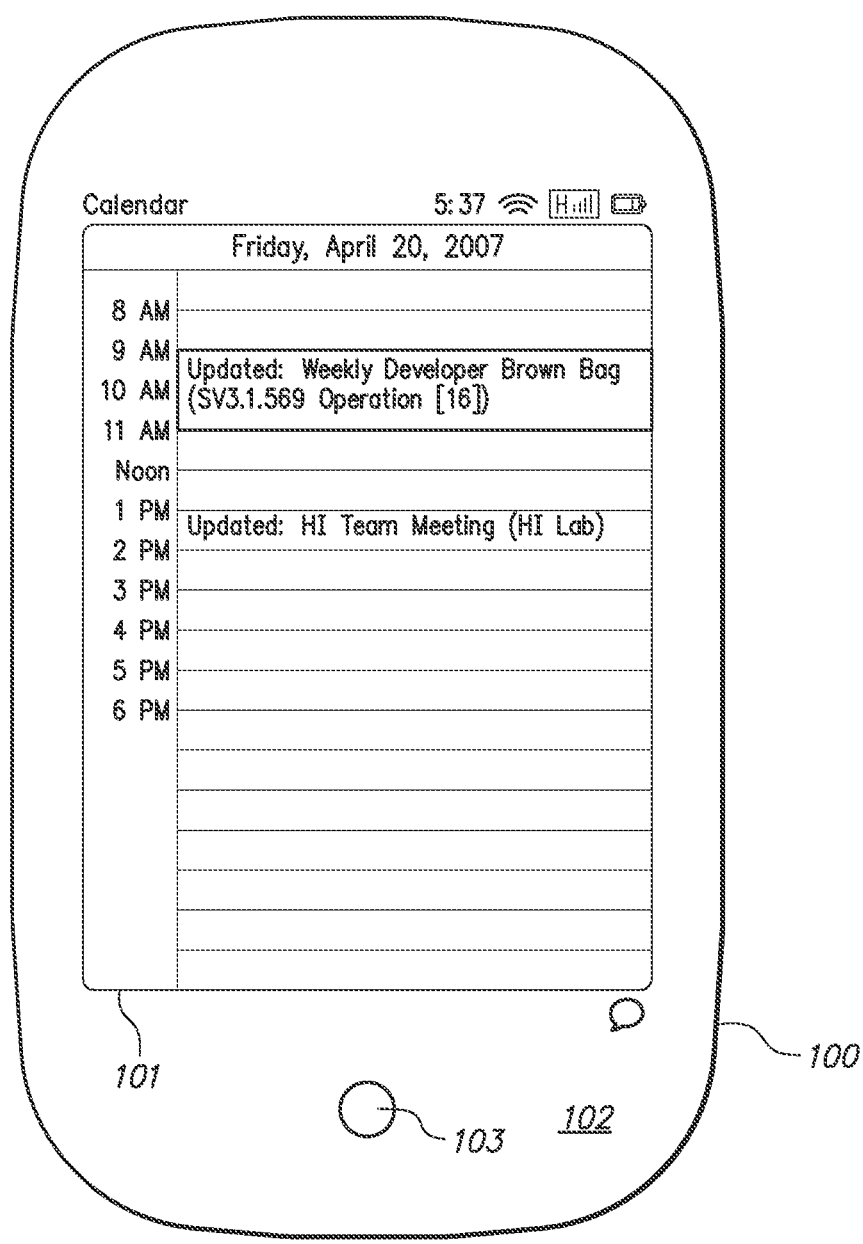
FIG. 2 depicts a display screen in full-screen mode, wherein an activity occupies substantially the entire display screen, according to one embodiment of the present invention.

Referring now to FIG. 2, there is shown display screen 101 in full-screen mode. In the example, a calendar application occupies substantially the entire display screen 101; however, one skilled in the art will recognize that any activity can be presented in this manner. As shown in FIG. 2, even in full-screen mode, certain portions of display screen 101 may be reserved for a title bar, battery indicator, clock, signal strength indicator, and the like. Accordingly, the term "full-screen mode" as used herein is intended to refer to any arrangement wherein the primary focus of the screen 101 is a single activity, even if other, smaller areas of screen 101 are reserved for other functions.

The user interacts with the active activity (such as the calendar application shown in FIG. 2) by conventional user interface methods, including manipulating on-screen elements, entering text, and the like. Such techniques are well known in the art.

Figure 3:
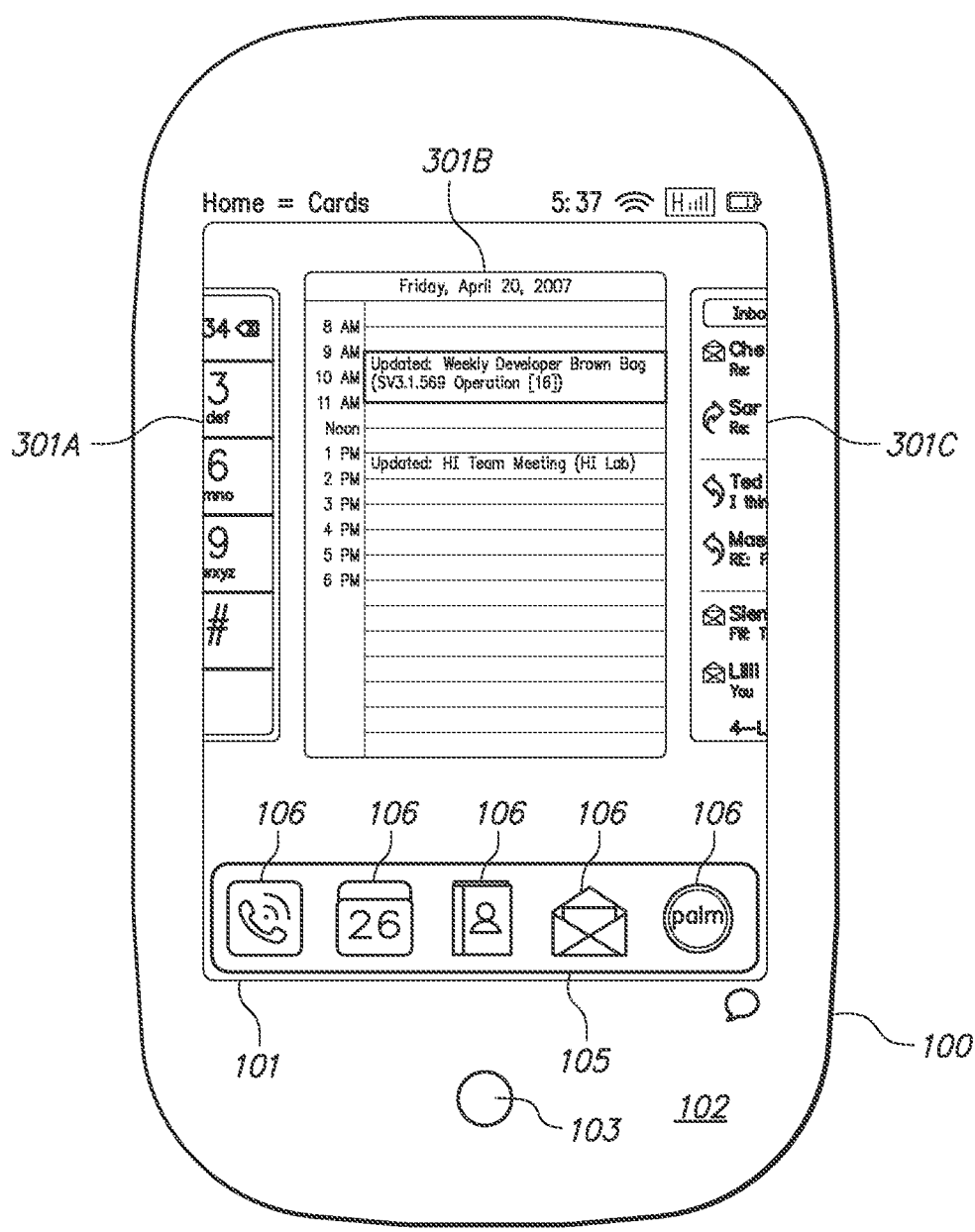
FIG. 3 depicts the display screen in windowed mode, including a window having focus and two partially displayed windows, according to one embodiment of the present invention.

Referring now to FIG. 3, there is shown an example of display screen 101 in windowed mode. In one embodiment, the user can toggle between full-screen mode and windowed mode by pressing physical button 103. In another embodiment, the user can touch or double-tap an activity 301B in windowed mode to initiate a switch to full-screen mode. In yet another embodiment, device 100 switches from windowed mode to full-screen mode after some period of inactivity. Other mechanisms can also be provided for toggling between the modes.

As can be seen in FIG. 3, in windowed mode, window 301B having focus is fully visible. Other windows 301A, 301C are only partially visible and do not have focus. Usually, window 301B having focus represents the same activity that was displayed in full-screen mode immediately before the switch to windowed mode. Any number of partially displayed windows 301A, 301C can be presented. In the example of FIG. 3, two such windows 301A, 301C are shown, one on either side of window 301B having focus. Typically, in an arrangement where windows 301 are presented along a linear axis, one or two partially displayed window(s) 301 can be displayed adjacent to the window 301 that has focus. Also, as shown in FIG. 3, in one embodiment, partially displayed windows 301A, 301C are shown slightly smaller than window 301B having focus, so as to further emphasize the fact that window 301B has focus.

Partially displayed windows 301A, 301C provide a positional context for window 301B, and provide a mechanism for navigating to other activities. In one embodiment, the user can designate a window 301A, 301C to have focus by touching any area within the window; this causes the designated window 301 to move to the central portion of display screen 101, and causes other windows to move as well, so that the same positional sequence is maintained. In one embodiment, the user can designate a window 301A, 301C to have focus by dragging any displayed window 301 to cause the desired window 301 to move to the central portion of display screen 101; again, other windows 301 move as well, so that the same positional sequence is maintained. In one embodiment, the user can move windows 301 left and right by dragging a finger along gesture area 102. In one embodiment, such a gesture can be performed even in full-screen mode, causing windows 301 to move left and right in the same manner as described above for windowed mode.

As described in more detail below, when the user drags a window 301 to the left or right within display screen 100, other windows 301 move in concert with the dragged window 301. Thus, for example, if the user drags window 301B to the right, windows 301A and 301C move to the right as well. This would cause window 301C to move off the screen, and window 301A would move to the central position of display screen 100. The same result would occur if the user drags window 301A to the right.

In one embodiment, if the user drags windows 301 so as to place a window 301 sufficiently close to the central position to make it clear that the intention is to give the window 301 focus, the window 301 snaps into the central position upon completion of the drag operation. Other windows 301 snap into place accordingly to maintain the same positional sequence. Thus, the user need not drag the window 301 all the way to the central position. If, on the other hand, the user drags windows 301 a small amount that does not cause a new window 301 to be sufficiently close to the central position, all windows 301 snap back to their previous positions upon completion of the drag operation.

In one embodiment, windows 301 show applications or other activities in operation. Thus, as the user navigates among windows 301, he or she can see the actual live application or other activity within each window 301.

Figure 4:
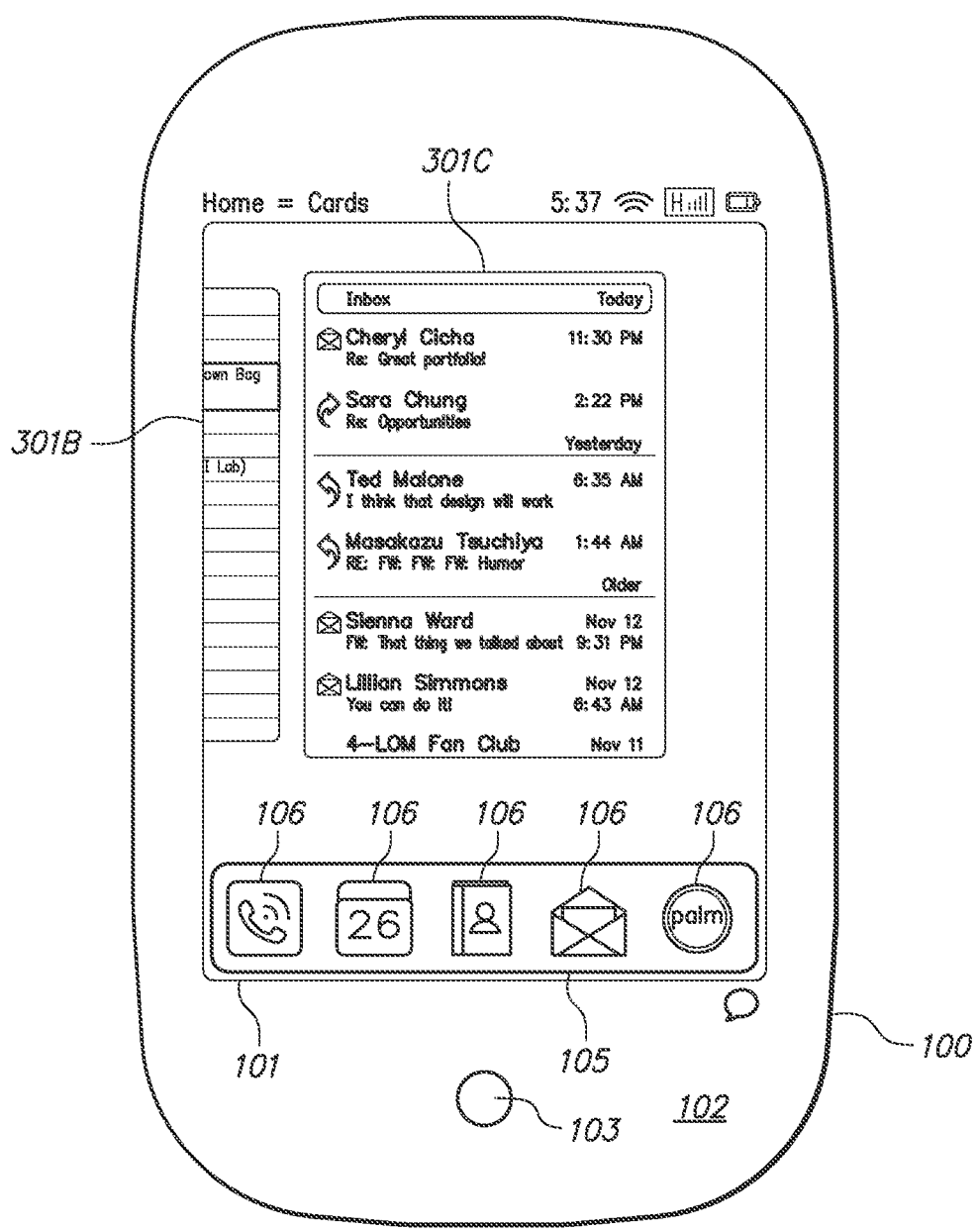
FIG. 4 depicts the display screen in windowed mode after the user has moved the windows, according to one embodiment of the present invention.

Referring now to FIG. 4, there is shown an example of display screen 101 in windowed mode, after the user has caused window 301C (representing an email application) to become centrally located and to have focus. As can be seen in FIG. 4, window 301B that previously had focus is now partially visible to the left of window 301C. Window 301A is no longer visible.

Figure 5:
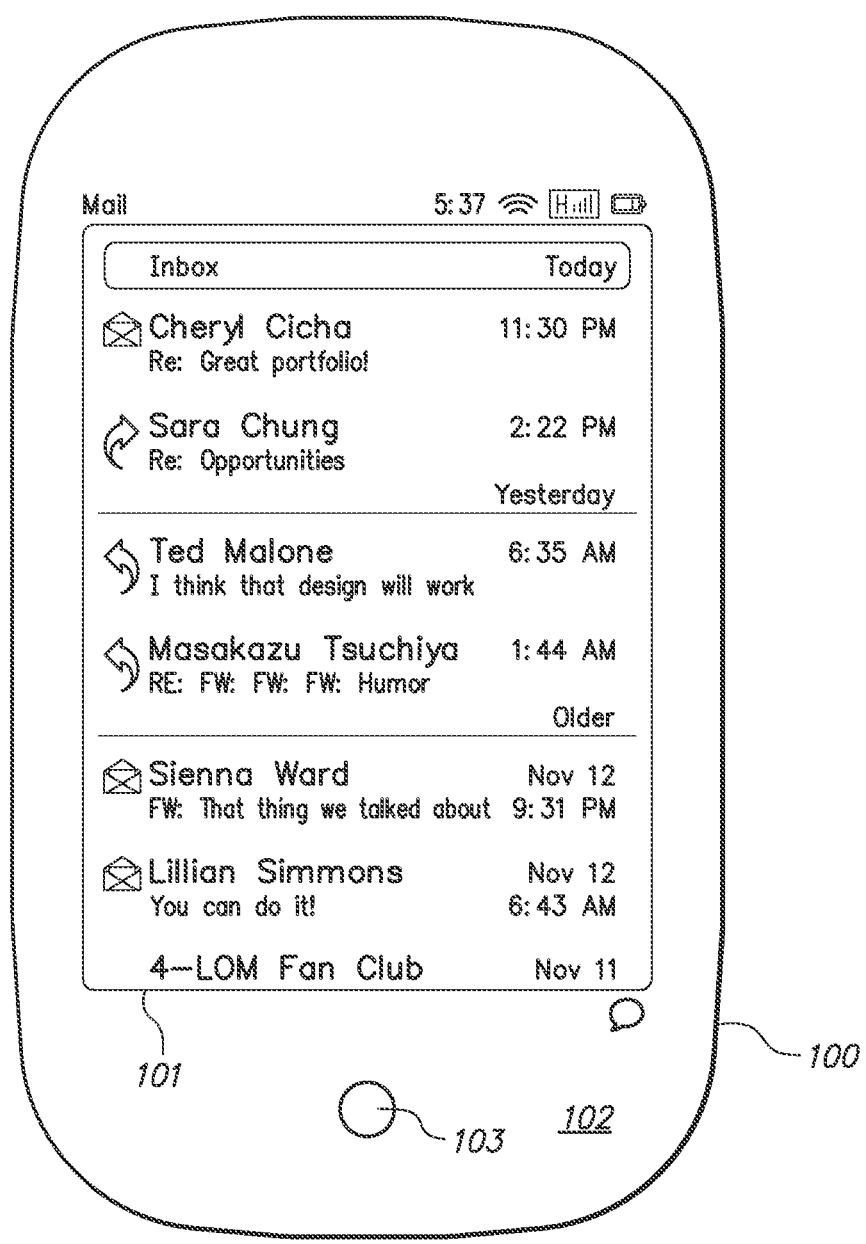
FIG. 5 depicts the display screen in full-screen mode after the user has designated a new activity as having focus, according to one embodiment of the present invention.

The user can touch or double-tap window 301C to re-enter full-screen mode with the new activity having focus and being active, as shown in FIG. 5. Alternatively, the user can press button 103 to toggle between full-screen mode and windowed mode. Thus, in FIG. 5 the user has completed the switch from the calendar application of FIG. 2 to the email application.

In the examples described herein, windows 301 are arranged in a horizontal row. The user moves windows 301 along a horizontal axis to navigate from one activity to another. One skilled in the art will recognize that other arrangements are possible. For example, windows 301 could be arranged vertically instead of horizontally. Alternatively, a two-dimensional arrangement of windows 301 can be provided.

Referring now to FIG. 7, there is shown a conceptual depiction of a sequence switching from one activity to another according to one embodiment of the present invention. A number of activities are open, each represented by a window 301A through 301H. Screen 101 only shows a subset of the windows 301 at any given time. As can be seen in the Figure, a positional sequence is maintained even though most of the windows 301 are not visible at any given time. FIG. 7 depicts movement of the display screen 101 from an initial position where window 301B has focus (and windows 301A and 301C are partially visible) to a second position where window 301E is has focus (and windows 301D and 301F are partially visible).

The movement of display screen 101 is conceptual. In actual operation, the switch from window 301B to window 301E is accomplished by moving windows 301 in a leftward direction on screen 101. For example, the user can repeatedly drag windows 301 in a leftward direction to cause windows 301C, 301D, and 301E to successively occupy the central position. Alternatively, the user can click on partially displayed window 301C to move it to the central position and to cause window 301D to be partially displayed, then on partially displayed window 301D to move it to the central position and to cause window 301E to be partially displayed, and then on partially displayed window 301E to move it to the central position. Either mechanism operates to shift focus from the activity represented by window 301B to the activity represented by window 301E.

In one embodiment, a transition effect is performed to enhance the smoothness of the transition as windows 301 move and/or snap into place. In one embodiment, the window 301 that is centrally displayed at any given time is shown slightly larger than other windows 301.

In one embodiment, more than one window 301 can be completely visible within screen 101. For example, three windows 301 might be completely visible, with additional partially-visible windows 301 on either side. The above-described techniques for moving windows 301 in concert with one another to maintain positional sequence still apply in such a variation.

In general, the sequence of windows 301 is persistent, even when the user moves from one window to another 301. In one embodiment, the sequence is circular, so that the rightmost window 301 is considered to be to the left of the leftmost window 301. Thus, moving off one end of the sequence takes the user back to the other end of the sequence.

In one embodiment, windows 301 may be moved within the sequence automatically in some circumstances. For example, frequently used windows 301 can be moved to more prominent locations in the sequence, while less frequently used windows 301 can remain in less prominent locations.

Figure 6A:
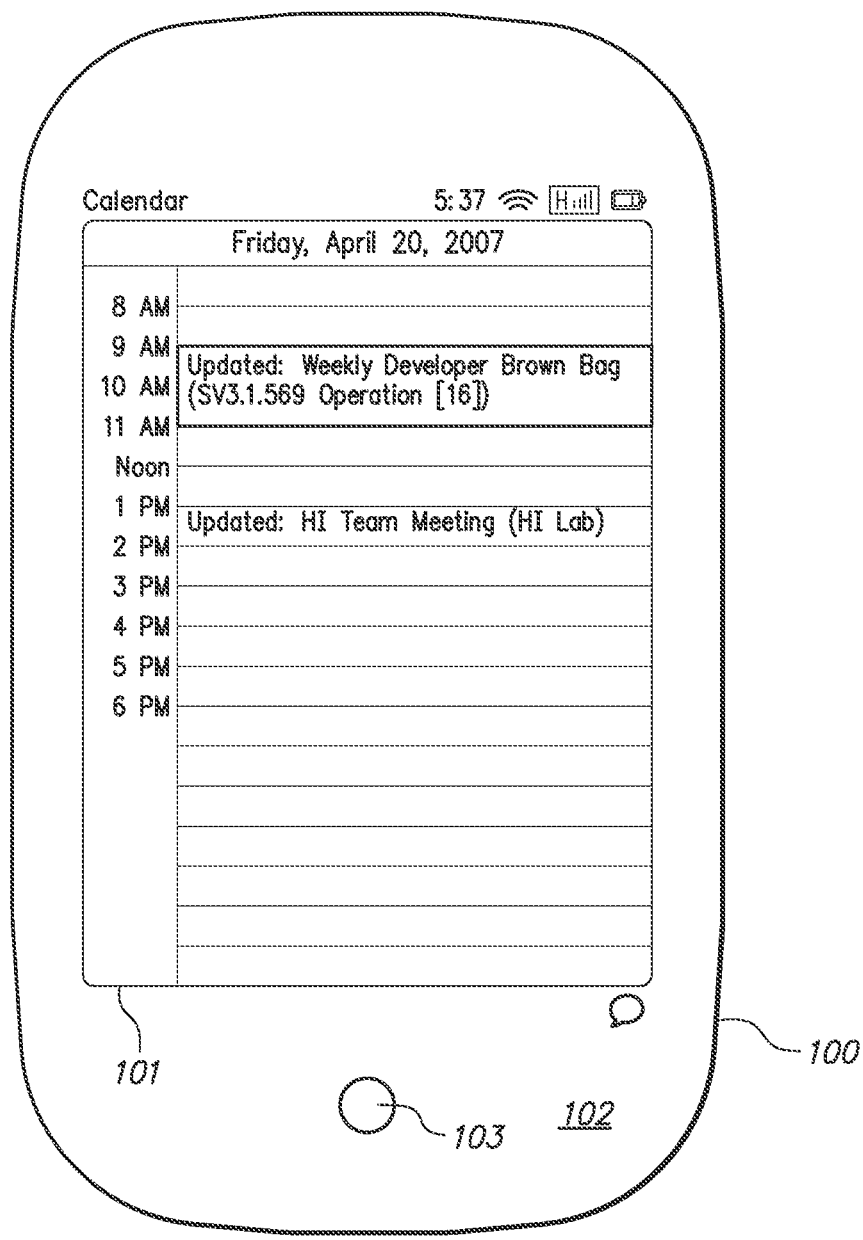
FIGS. 6A through 6F depict a sequence for switching from one activity to another according to one embodiment of the present invention.
Figure 6B:
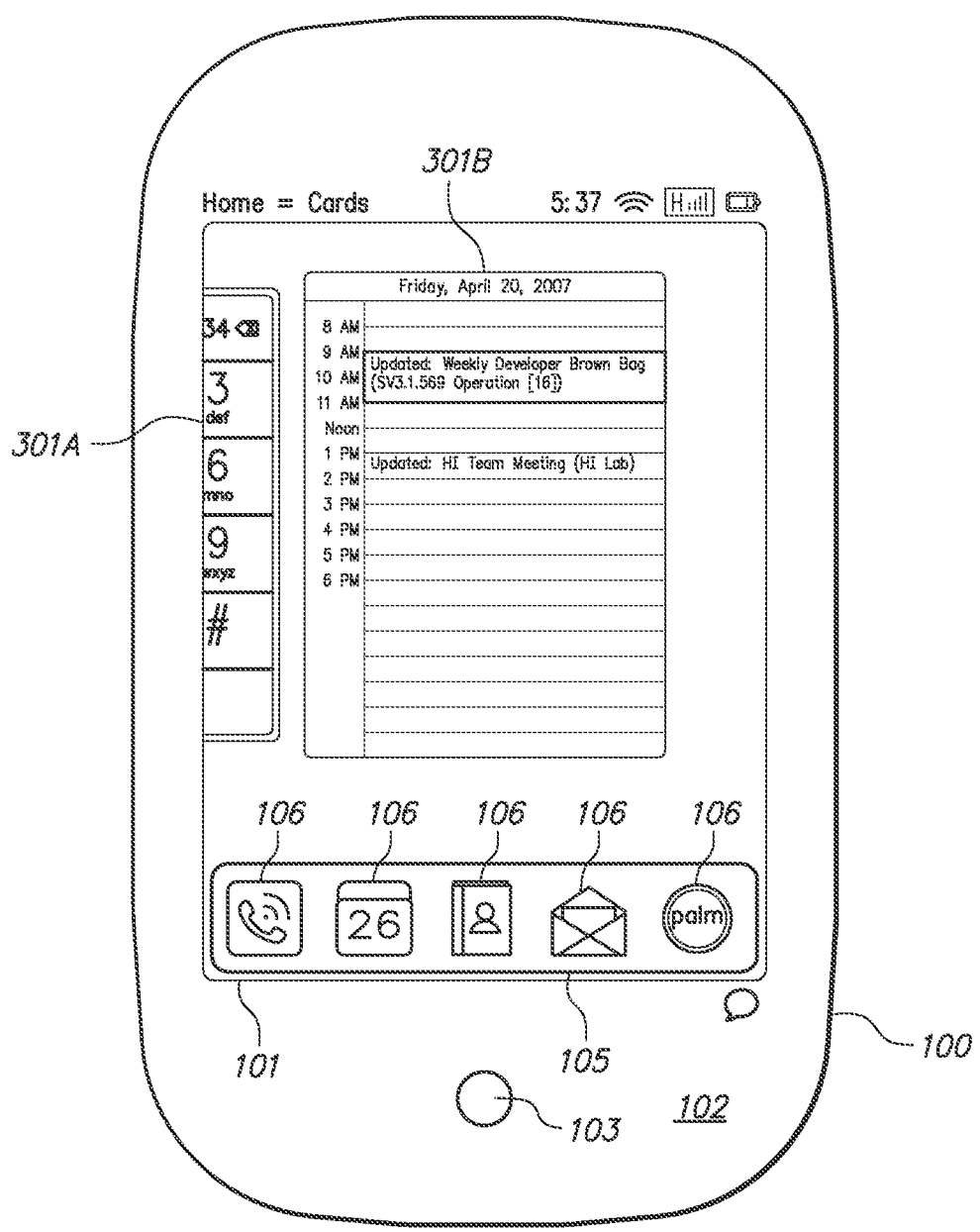
Figure 6C:
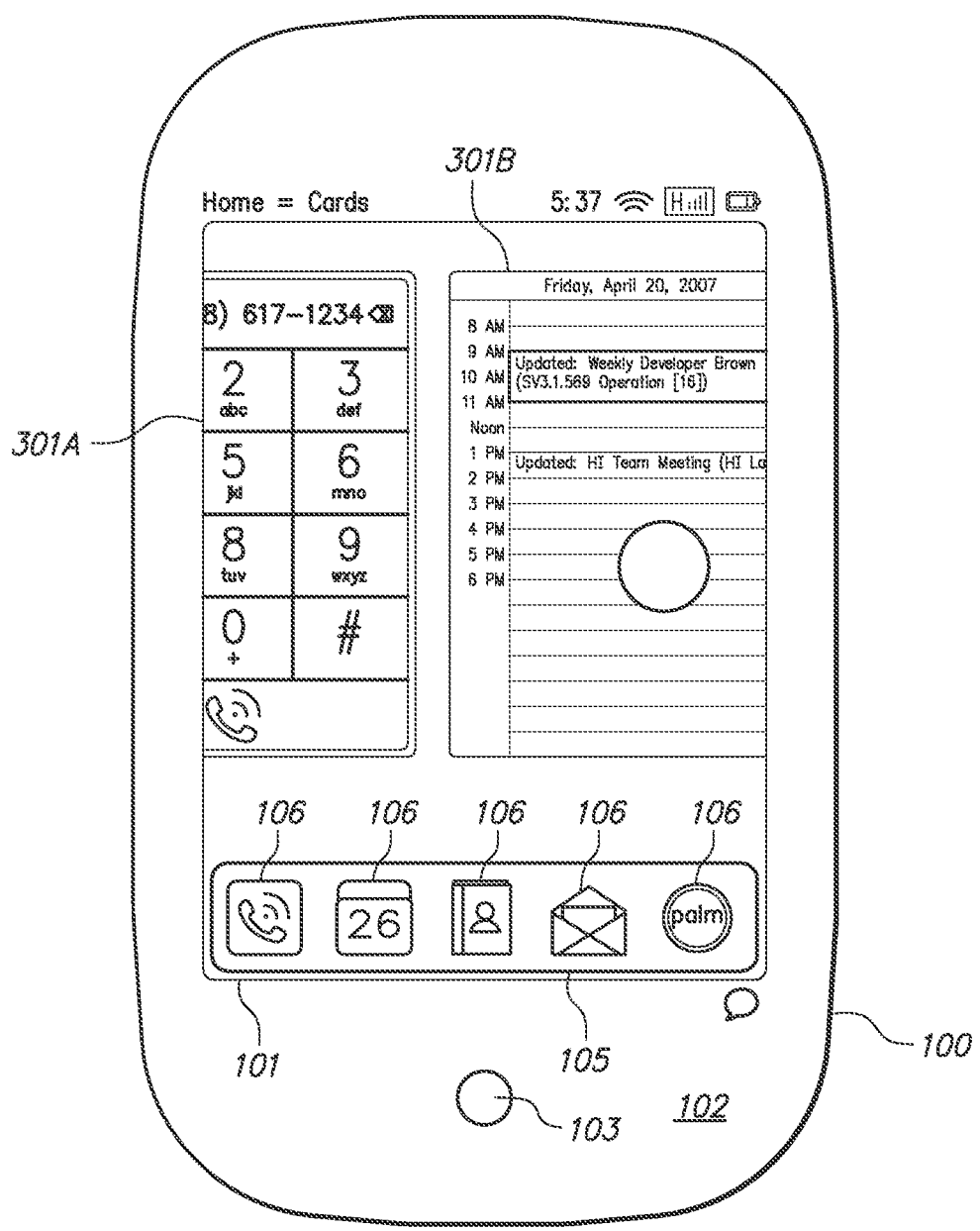
Figure 6D:
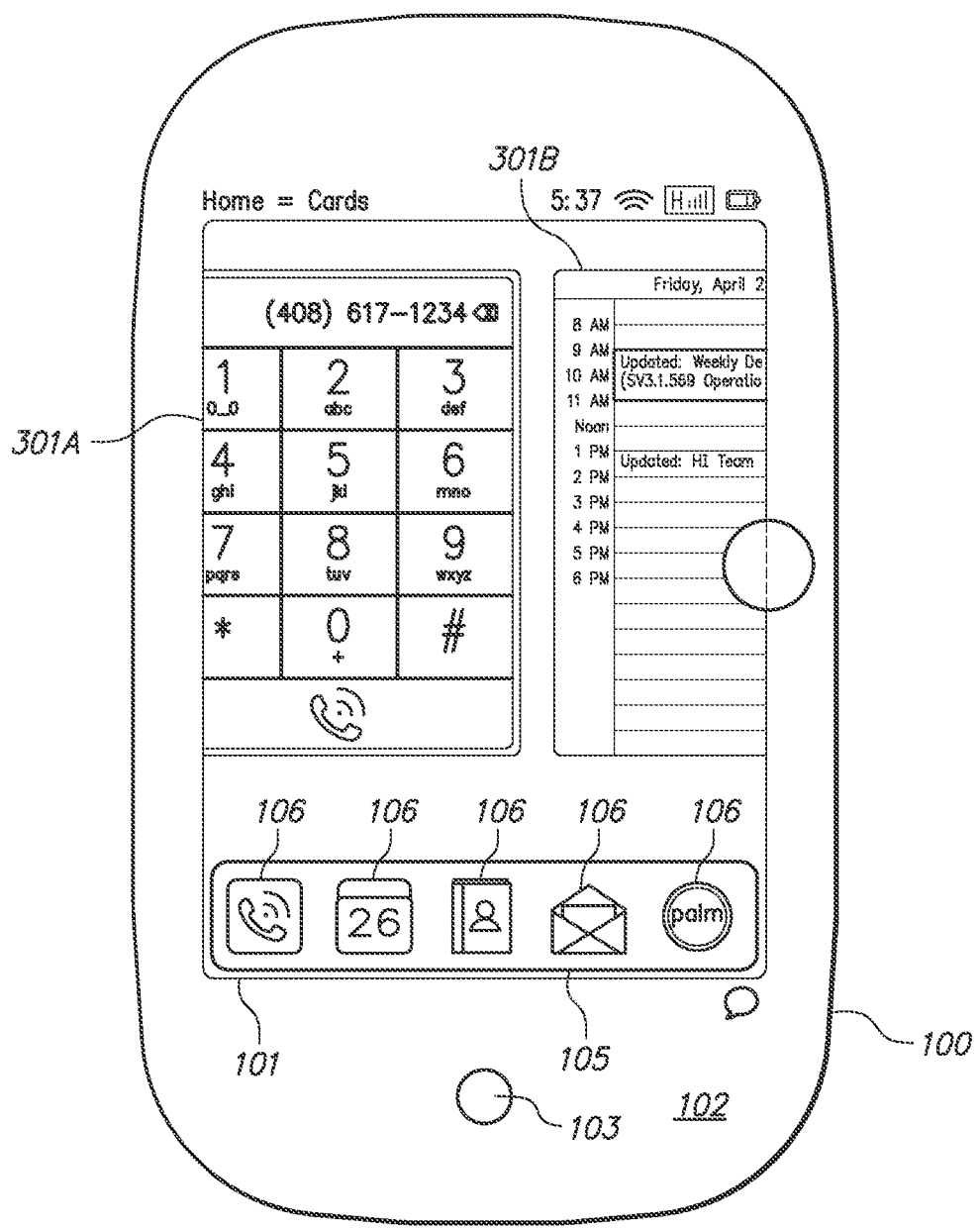
Figure 6E:
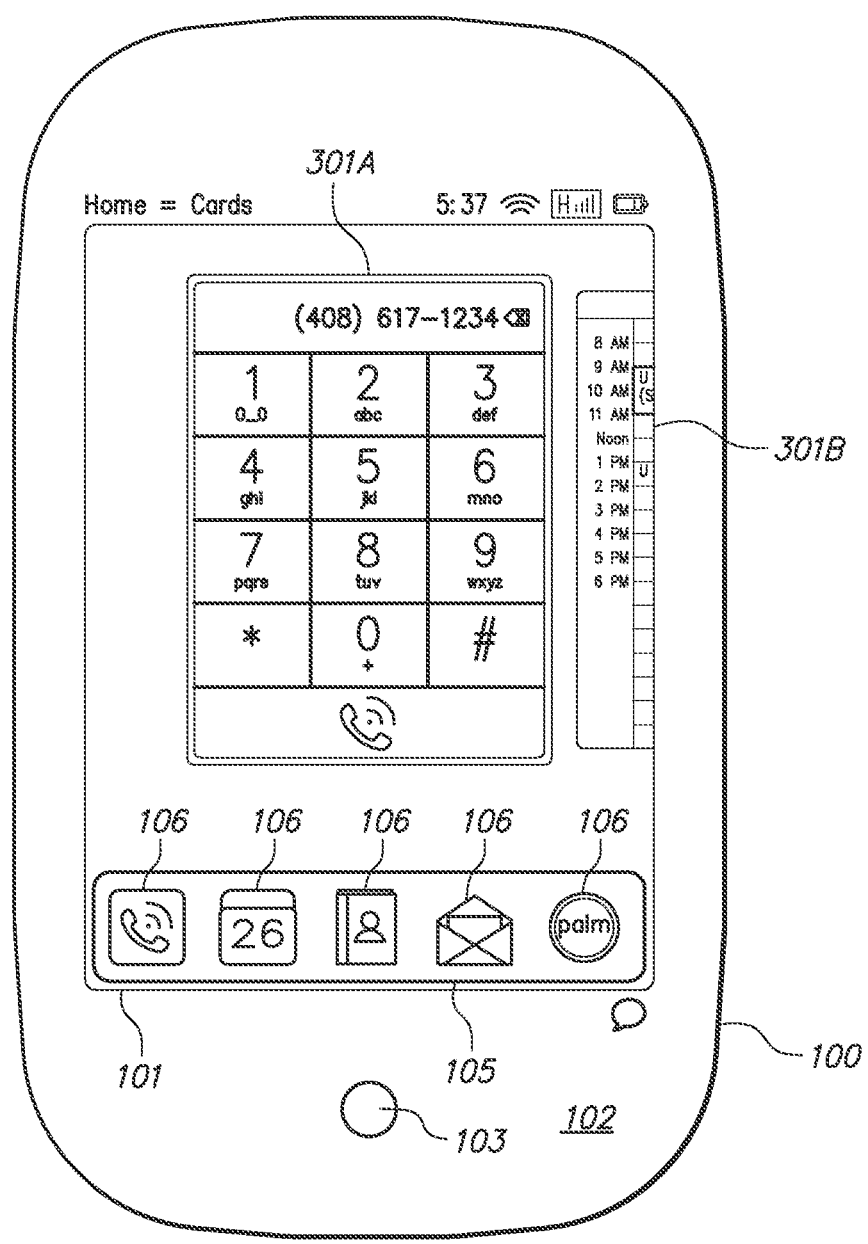

Referring now to FIGS. 6A through 6F, the operation of the invention is further illustrated by way of an example of a sequence for switching from one activity to another; specifically, the user switches from a calendar application to a telephone application. FIG. 6A shows an initial state in which device 100 shows a calendar application in full-screen mode. In FIG. 6B, the user has switched to windowed mode, for example by pressing button 103. Now, the calendar application is visible in window 301B, and the telephone application is partially visible in window 301A. FIGS. 6C through 6E show the effect of the user dragging window 301B in a rightward direction. As the user drags window 301B, window 301A also moves in a rightward direction, until it is centrally located in display screen 101, as shown in FIG. 6E. As discussed above, this motion can also be initiated in response to the user touching the visible portion of window 301A in FIG. 6B, or by dragging in a horizontal rightward direction in gesture area 102.

Figure 6F:

Once the telephone application is in the central position in window 301A as shown in FIG. 6E, the user can tap on window 301A or press button 103 to switch to full-screen mode, as shown in FIG. 6F. In one embodiment, the user can also interact with the telephone application directly in windowed mode as shown in FIG. 6E.

The user can launch additional activities by returning to the launch screen as shown in FIG. 1. In one embodiment, this is performed by performing a gesture or other command. In one embodiment, the user can also launch additional activities by touching an icon 106 in dock 105. In one embodiment, newly launched activities generate new windows that are added to the end of the sequence of windows shown in FIG. 7. In one embodiment, the window for the newly launched activity is, by default, given focus and presented in the central position on screen 101.

Figure 8A:
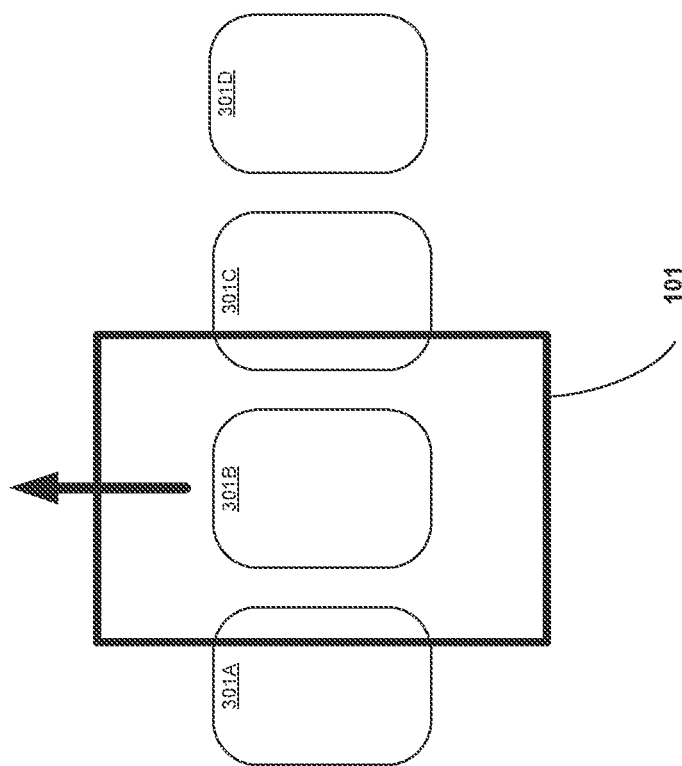
FIGS. 8A and 8B depict a sequence for dismissing an activity according to one embodiment of the present invention.
Figure 8B:
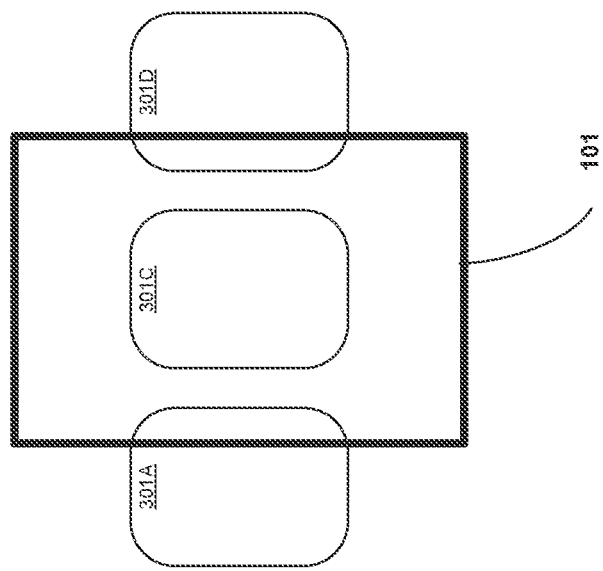

The user can dismiss applications, for example by closing a window 301. In one embodiment, a window 301 can be closed by clicking on a control within the window. In another embodiment, a window 301 can be closed by dragging the window upward off screen 101. Referring now to FIGS. 8A and 8B, there is shown an example of a sequence where the user drags window 301B upward off screen 101, causing window 301B to be dismissed.

As can be seen in FIGS. 8A and 8B, dismissing window 301B causes 301C to move leftward to fill in the gap caused by window 301B being dismissed. In general, when a window 301 is dismissed, other windows 301 move to fill the gap.

In one embodiment, dismissing a window 301 causes the application associated with the window to close. In another embodiment, the application remains open even when window 301 is closed.

In one embodiment, a window 301 might close automatically in certain circumstances. For example, if a task associated with an application is completed, or if an application crashes or terminates, the window 301 for the application can close automatically.

Figure 9A:
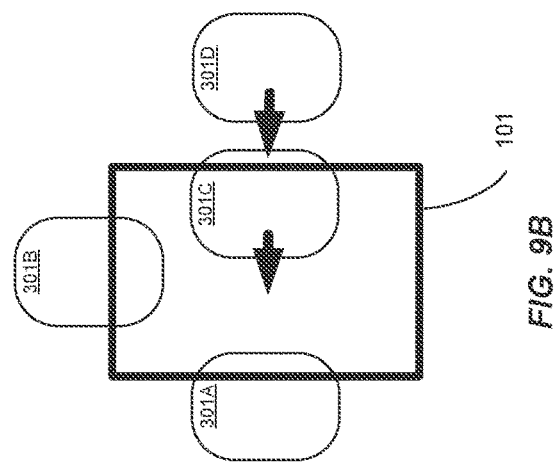
FIGS. 9A through 9D depict a sequence for rearranging activities according to one embodiment of the present invention.
Figure 9B:
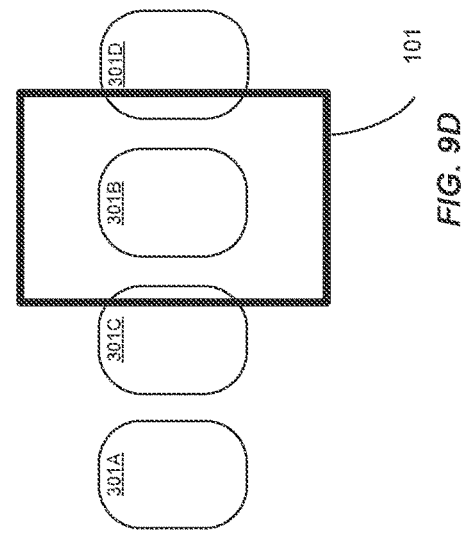
Figure 9C:
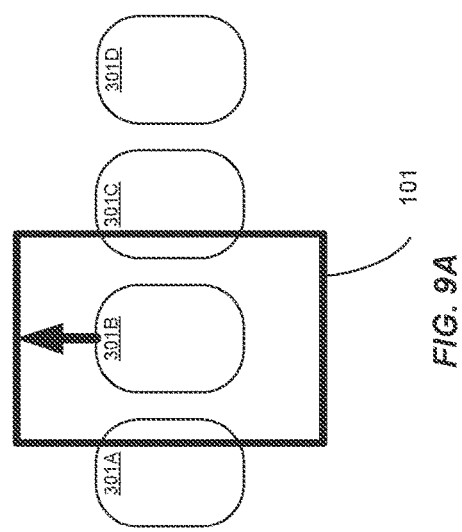
Figure 9D:
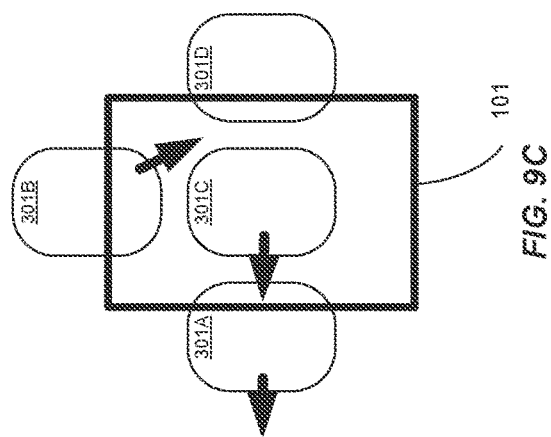

The user can also rearrange windows 301 manually when desired, by dragging a window 301 from one position to another. An example is shown in FIGS. 9A through 9D. The user drags window 301B upward, causing windows 301C and 301D to move to fill the gap. The user does not release window 301B however; instead, he or she moves window 301B into a position between windows 301C and 301D, as shown in FIG. 9C. The result is the sequence shown in FIG. 9D, where window 301B is now positioned between windows 301C and 301D.

In one embodiment, the user can resize windows 301 as desired. For example, the user can drag a corner of a window 301 to resize it, or can use two fingers to pinch the edges or corners of a window 301 to resize it.

To summarize, then, any or all of the following actions may be enabled for displayed windows 301:
- Press button 103: toggle between full-screen and windowed modes
- Drag window 301 left or right: cause windows to move left or right, and change focus
- Horizontal gesture in gesture area 102: cause windows to move left or right, and change focus
- Touch partially displayed window 301: cause window 301 to gain focus and move to center
- Touch (or double-tap) window 301 having focus: switch to full-screen mode
- Drag window 301 upward: dismiss window
- Drag window 301 downward: zoom out, causing more windows 301 to be shown concurrently on screen 101; the user can zoom back in by tapping any empty space.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment," "an embodiment," or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A mobile computing device comprising:
a processor configured to operate at least a first application and a second application concurrently;
a touch-sensitive display screen coupled to the processor, the processor to receive gesture input on the touch-sensitive display screen and operate the mobile computing device in any one of at least two display modes that includes a full-screen mode and a windowed mode, wherein:
in the full-screen mode, the processor presents, on the touch-sensitive display screen, a user interface for only one of the first application or the second application; and
in the windowed mode, the processor:
presents a plurality of windows arranged linearly along an axis of the touch-sensitive display screen, the plurality of windows including at least a first window displaying a view of the first application and at least a portion of a second window displaying a view of the second application, the first application different than the second application;
responds to a first user gesture on the touch-sensitive display screen in a first direction along the axis by moving the plurality of windows in concert with one another in the first direction along the axis such that the portion of the second window presented on the touch-sensitive display screen increases or decreases based on the first direction;
responds to a second user gesture on a selected window of the first window or the second window by moving the selected window along a second direction that is different than the first direction and dismissing the selected window from the touch-sensitive display screen in the second direction; and closes the corresponding first application or second application based on the dismissal of the selected window;
wherein the processor, in response to receiving a user input indicating a mode change, transitions the computing device at least (i) from the full-screen mode to the windowed mode, or (ii) from the windowed mode to the full-screen mode.

2. The computing device of claim 1, wherein in the full-screen mode, the processor:
presents the user interface for the first application as a full-screen window or presents the user interface for the second application as a full-screen window; and
responds to a gesture on a gesture area of the touch-sensitive display screen in the first direction by moving the full-screen window of one of the first application and the second application to be replaced by the full-screen window of the other of the first application and the second application.

3. The computing device of claim 1, wherein the first direction is along a horizontal axis of the touch-sensitive display screen, and wherein the second direction is along a vertical axis of the touch-sensitive display screen.

4. The computing device of claim 3, wherein the second direction is upwards.

5. The computing device of claim 1, wherein the second user gesture on the selected window comprises an upward dragging gesture beginning on the selected window.

6. The computing device of claim 1, wherein the first direction is along a vertical axis of the touch-sensitive display screen, and wherein the second direction is along a horizontal axis of the touch-sensitive display screen.

7. The computing device of claim 1, wherein a same type of the user input indicating the mode change is used to transition the computing device from the full-screen mode to the windowed mode and from the windowed mode to the full-screen mode.

8. The computing device of claim 1, further comprising a physical button coupled to the processor, wherein the user input indicating the mode change comprises pressing the physical button.

9. The computing device of claim 1, wherein dismissing the selected window from the touch-sensitive display screen in the second direction comprises dragging the selected window upward off the touch-sensitive display screen.

10. The computing device of claim 9, wherein the selected window is dragged off an edge of the touch-sensitive display screen.

11. The computing device of claim 1, wherein the selected window is moved in the second direction out of the linear arrangement of the non-selected windows of the plurality of windows.

12. The computing device of claim 1, wherein a direction of the second user gesture is the same direction in which the selected window is moved by the second user gesture.

13. The computing device of claim 1, wherein the selected window of the first window or the second window is selected based on the second user gesture being performed on the selected window.

14. The computing device of claim 1, wherein the selected window is moved along the second direction in concert with the second user gesture.

15. A method for managing applications on a mobile computing device having a touch-sensitive display screen coupled to a processor that operates at least a first application and a second application concurrently, the method comprising:

operating the mobile computing device in any one of at least two display modes that includes a full-screen mode and a windowed mode;

in the full-screen mode, presenting, on the touch-sensitive display screen, a user interface for only one of the first application or the second application; and in the windowed mode:
   presenting a plurality of windows arranged linearly along an axis of the touch-sensitive display screen, the plurality of windows including at least a first window displaying a view of the first application and at least a portion of a second window displaying a view of the second application, the first application different than the second application;
   responding to a first user gesture on the touch-sensitive display screen in a first direction along the axis by moving the plurality of windows in concert with one another in the first direction along the axis such that the portion of the second window presented on the touch-sensitive display screen increases or decreases based on the first direction;
   responding to a second user gesture on a selected window of the first window or the second window by moving the selected window along a second direction that is different than the first direction and dismissing the selected window from the touch-sensitive display screen in the second direction; and
   closing the corresponding first application or second application based on the dismissal of the selected window; and in response to receiving a user input indicating a mode change, transitioning the computing device at least (i) from the full-screen mode to the windowed mode, or (ii) from the windowed mode to the full-screen mode.

16. The method of claim 15, further comprising, in the full-screen mode:
   presenting the user interface for the first application as a full-screen window or presents the user interface for the second application as a full-screen window; and
   responding to a gesture on a gesture area of the touch-sensitive display screen in the first direction by moving the full-screen window of one of the first application and the second application to be replaced by the full-screen window of the other of the first application and the second application.

17. The method of claim 15, wherein the first direction is along a horizontal axis of the touch-sensitive display screen, and wherein the second direction is along a vertical axis of the touch-sensitive display screen.

18. The method of claim 17, wherein the second direction is upwards.

19. The method of claim 15, wherein the second user gesture on the selected window comprises an upward dragging gesture beginning on the selected window.

20. The method of claim 15, wherein the first direction is along a vertical axis of the touch-sensitive display screen, and wherein the second direction is along a horizontal axis of the touch-sensitive display screen.

21. The method of claim 15, wherein a same type of the user input indicating the mode change is used to transition the computer system from the full-screen mode to the windowed mode and from the windowed mode to the full-screen mode.

22. The method of claim 15, wherein the computer system further comprises a physical button coupled to the processor, and the user input indicating the mode change comprises the user pressing the physical button.

23. The method of claim 15, wherein dismissing the selected window from the touch-sensitive display screen in the second direction comprises dragging the selected window upward off the touch-sensitive display screen.

24. The method of claim 23, wherein the selected window is dragged off an edge of the touch-sensitive display screen.

25. The method of claim 15, wherein the selected window is moved in the second direction out of the linear arrangement of the non-selected windows of the plurality of windows.

26. The method of claim 15, wherein a direction of the second user gesture is the same direction in which the selected window is moved by the second user gesture.

27. The method of claim 15, wherein the selected window of the first window or the second window is selected based on the second user gesture being performed on the selected window.

28. The method of claim 15, wherein the selected window is moved along the second direction in concert with the second user gesture.

* * * * *